(12) United States Patent
Choi

(10) Patent No.: US 10,253,743 B2
(45) Date of Patent: Apr. 9, 2019

(54) APPARATUS AND METHOD FOR CONTROLLING START OF VEHICLE ENGINE

(71) Applicants: Hyundai Motor Company, Seoul (KR); Kia Motors Corporation, Seoul (KR)

(72) Inventor: Kwang-Seok Choi, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/810,723

(22) Filed: Nov. 13, 2017

(65) Prior Publication Data

US 2018/0171961 A1 Jun. 21, 2018

(30) Foreign Application Priority Data

Dec. 15, 2016 (KR) ........................ 10-2016-0171446

(51) Int. Cl.
| | | |
|---|---|---|
| *F02N 11/10* | (2006.01) | |
| *B60W 10/06* | (2006.01) | |
| *B60W 10/08* | (2006.01) | |
| *B60W 20/13* | (2016.01) | |

(Continued)

(52) U.S. Cl.
CPC ........... *F02N 11/108* (2013.01); *B60W 10/06* (2013.01); *B60W 10/08* (2013.01); *B60W 20/13* (2016.01); *F02N 11/0866* (2013.01); *B60W 2510/244* (2013.01); *B60W 2510/30* (2013.01); *B60W 2710/244* (2013.01); *B60W 2710/30* (2013.01); *F02N 11/006* (2013.01); *F02N 11/04* (2013.01);

(Continued)

(58) Field of Classification Search
CPC .............. F02N 11/108; F02N 11/0866; F02N 2011/0888; B60W 20/13; B60W 10/06; B60W 10/08; B60W 2510/244; B60W 2510/30; B60W 2710/244; B60W 2710/30; Y10S 903/93
USPC ....... 701/22; 180/65.1, 65.21, 65.24, 65.285, 180/65.29
See application file for complete search history.

(56) References Cited

U.S. PATENT DOCUMENTS 8,544,575 B1 * 10/2013 Scaringe ................ B60K 6/485
  180/65.21
2006/0097577 A1 * 5/2006 Kato ................... F02N 11/0866
  307/10.1

(Continued)

FOREIGN PATENT DOCUMENTS

| KR | 10-2005-0045591 A | 5/2005 |
|---|---|---|
| KR | 10-2013-0136780 A | 12/2013 |

*Primary Examiner* — Marthe Y Marc-Coleman
(74) *Attorney, Agent, or Firm* — Morgan, Lewis & Bockius LLP

(57) ABSTRACT

An apparatus for controlling a start of an engine may include the engine, a first motor connected to a crankshaft by a first connecting device to start the engine, a main battery supplying a start power to the first motor, a controller configured to monitor components of a vehicle according to a start command for the engine to generate diagnostic information and generating a reverse charging control command to supply the reverse charging power to the main battery as the determination result of the diagnostic information, and an auxiliary battery supplying the reverse charging power to the main battery according to the reverse charging control command.

18 Claims, 3 Drawing Sheets

(51) Int. Cl.
*F02N 11/08* (2006.01)
*F02N 11/00* (2006.01)
*F02N 11/04* (2006.01)

(52) U.S. Cl.
CPC . *F02N 2011/0888* (2013.01); *F02N 2200/063* (2013.01); *F02N 2300/2002* (2013.01); *Y02T 10/6226* (2013.01); *Y02T 10/6286* (2013.01); *Y02T 10/7005* (2013.01); *Y02T 10/92* (2013.01); *Y10S 903/93* (2013.01)

(56) References Cited

U.S. PATENT DOCUMENTS

| | | | | |
|---|---|---|---|---|
| 2007/0161455 | A1* | 7/2007 | King | B60K 6/26 477/3 |
| 2008/0011528 | A1* | 1/2008 | Verbrugge | B60K 6/28 180/65.29 |
| 2009/0020081 | A1* | 1/2009 | Claypole | B60K 11/02 123/41.31 |
| 2009/0145674 | A1* | 6/2009 | Lee | B60K 6/405 180/65.1 |
| 2011/0133694 | A1* | 6/2011 | Song | B60L 1/14 320/109 |
| 2012/0139487 | A1* | 6/2012 | Kim | B60R 16/033 320/109 |
| 2015/0051769 | A1* | 2/2015 | Maruyama | B60K 6/445 701/22 |
| 2015/0251588 | A1* | 9/2015 | Salter | B60Q 1/268 362/510 |
| 2015/0343904 | A1* | 12/2015 | Ikeyama | B60L 3/0007 701/22 |
| 2017/0043757 | A1* | 2/2017 | Sujan | B60W 10/06 |

* cited by examiner

APPARATUS AND METHOD FOR CONTROLLING START OF VEHICLE ENGINE

CROSS-REFERENCE(S) TO RELATED APPLICATIONS

The present application claims priority to Korean Patent Application No. 10-2016-0171446, filed on Dec. 15, 2016, the entire contents of which is incorporated herein for all purposes by the present reference.

BACKGROUND OF THE INVENTION

Field of the Invention

The present invention relates to an engine start control technique, and, more, to an apparatus and a method for controlling a start of a vehicle engine configured to prevent a situation wherein the engine may not be started due to an insufficient charge of a main battery.

Description of Related Art

Generally, in a case of a hybrid vehicle, a power shortage requires an increase in capacity of an alternator and a battery. Therefore, an increase in a number of wirings/harnesses and/or an increase in a weight of the vehicle is required.

Generally, a maximum power capacity (up to approximately 2.5 kW) that may be supplied by an auxiliary battery (e.g., output voltage of approximately 12 V) that supplies power to a plurality of electrical loads or the like may be limited.

However, with an ever increasing and extending application of new technology, as internal factors, electric consumption is increasing. In addition, as external factors, fuel economy and exhaust gas regulations need to be tightened or convenience of driving needs to be improved.

When more power is required than an amount of power provided by the auxiliary battery, a main battery having a different power source system (e.g., output voltage of approximately 41V, 48V, etc.) is used.

A vehicle having the above structure is called a mild-hybrid electric vehicle (Mild-HEV) or a Soft-HEV.

However, in the case of the Mild-HEV, when an engine start request is received, a state of the main battery is monitored to determine whether or not the engine may be started by a motor for the Mild-HEV. At the present point, when a state of charge (SOC) of the main battery is insufficient, the engine may not be started by the motor for the Mild-HEV, and the engine is started by a conventional starter. The present case leads to a decrease in commerciality in terms of noise and start-up time of the engine.

Furthermore, a problem occurs when the state of charge of the main battery is insufficient and the engine is not started by a conventional starter, the vehicle cannot move.

Therefore, in the case of the Mild-HEV, unlike the full HEV, the motor for the Mild-HEV and the main battery need to be able to drive a vehicle with the engine when a power electronic component for the vehicle, as an auxiliary device configured for the driving the vehicle, is not operational.

The information disclosed in this Background of the Invention portion is only for enhancement of understanding of the general background of the invention and should not be taken as an acknowledgement or any form of suggestion that this information forms the prior art already known to a person skilled in the art.

BRIEF SUMMARY

Various exemplary embodiments of the present invention are directed to provide an apparatus and a method for controlling a start of an engine configured to prevent a situation where the engine may not be stated when a state of charge of a main battery is insufficient.

Various aspects of the present invention are directed to providing an apparatus and a method for controlling a start of an engine configured to effectively reduce a vibration and or noise upon start of the engine.

Various aspects of the present invention are directed to providing an apparatus and a method for controlling a start of an engine configured to effectively reduce a start time of the engine.

Various aspects of the present invention are directed to providing an apparatus and a method for controlling a start of an engine configured for driving a vehicle when a power electronic component for a vehicle is not operational.

Other objects and advantages of the present invention can be understood by the following description, and become apparent with reference to the exemplary embodiments of the present invention. It will be obvious to those skilled in the art to which the present invention pertains that the objects and advantages of the present invention may be realized by the device as claimed and combinations thereof.

Various aspects of the present invention are directed to providing an apparatus for controlling a start of an engine configured to prevent a situation in which the engine may not be started when a state of charge of a main battery is insufficient.

In accordance with various exemplary embodiments of the present invention, an apparatus for controlling a start of an engine may include the engine; a first motor connected to a crankshaft by a first connecting device to start the engine; a main battery configured to supply a start power to the first motor; a controller configured to monitor a plurality of components of a vehicle according to a start command for the engine, and the controller is configured to generate diagnostic information and generate a reverse charging control command to supply the reverse charging power to the main battery as a determination result of the diagnostic information; and an auxiliary battery configured to supply the reverse charging power to the main battery according to the reverse charging control command.

The apparatus may further include a second motor supplied with the start power from the auxiliary battery when the components are in an abnormal state, and the second motor is connected to the crankshaft of the engine by a second connecting means.

The controller may include: a diagnostic module configured to generate the diagnostic information; a determination module configured to utilize the diagnostic information to determine a state of charge of the main battery or determine whether the components are in a normal state; and a start command module configured to utilize the first motor to start the engine when it is determined, according to a determination result, that the state of charge of the main battery is insufficient and starts the engine using the second motor when the components are in the abnormal state.

The first motor may be a mild hybrid starter and generator (MHSG).

The second motor may be a dedicated starter used in a hybrid electric vehicle (HEV).

The MHSG may be an inverter integrated MHSG including an inverter.

The main battery may be a super capacitor or a lithium ion battery, and the auxiliary battery may be a lead acid battery.

The reverse charging control command may be generated when the state of charge of the main battery is less than a predetermined first reference value and the state of charge of the auxiliary battery is greater than a predetermined second reference value.

The apparatus may further include: a converter located between the main battery and the auxiliary battery configured to regulate a power according to a control of the controller and selectively supply the regulated power.

The converter may be a bidirectional low direct current-direct current (DC-DC) converter (LDC).

The first and second connecting device may include a belt.

The components may be power electronic components for the vehicle.

In accordance with various exemplary embodiments of the present invention, a method for controlling a start of an engine may include monitoring, by a controller, a plurality of components of a vehicle according to a start command; generating, by the controller, diagnostic information according to the monitoring and generating a reverse charging control command to supply a reverse charging power to a main battery according to a determination result of the diagnostic information; supplying, by an auxiliary battery, the reverse charging power to the main battery according to the reverse charging control command; supplying, by the main battery, a start power to the first motor; and starting, by the first motor connected to a crankshaft of the engine by a first connecting means, the engine.

The generating of the reverse charging control command may include supplying the start power from the auxiliary battery to a second motor connected to the crankshaft of the engine by a second connecting device when the components are in an abnormal state.

The generating of the reverse charging control command may include: generating, by a diagnostic module, the diagnostic information; using, by a determination module, the diagnostic information to determine a state of charge of the main battery or determining whether the components are in a normal state; and starting the engine by allowing a start command module to use the first motor when it is determined, according to the determination result, that the state of charge of the main battery is insufficient, and starting the engine by allowing the start command module to use the second motor when the components are in the abnormal state.

The supplying of the reverse charging power may further include: selectively regulating and supplying, by a converter located between the main battery and the auxiliary battery, power according to a control of the controller.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
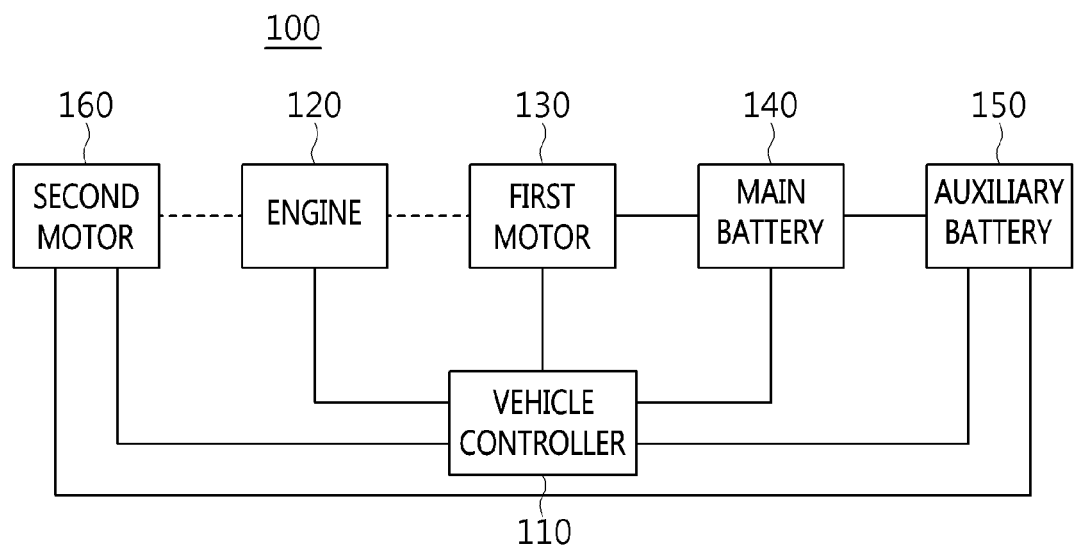
FIG. 1 is a configuration block diagram of an apparatus for controlling a start of an engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and the scope of the invention as defined in the appended claims.

Terms used in the specification, including "first", "second", etc. may be used to describe various components of the present invention, but the components are not to be construed as being limited to the given terms. The terms are only used to differentiate one component from other components.

For example, the "first" component may be named the "second" component and the "second" component may also be similarly named the "first" component, without departing from the scope of the present invention. The term "and/or" includes a combination of a plurality of items or any one of a plurality of terms.

Unless defined otherwise, it is to be understood that all the terms used in the specification, including technical and scientific terms, have the same meaning as those that are generally understood by those skilled in the art to which the present invention pertains.

It must be understood that the terms defined by the dictionary are identical with the meanings within the context of the related art, and they should not be ideally or excessively formally defined unless the context clearly dictates otherwise.

Hereinafter, an apparatus and a method for controlling a start of an engine according to an exemplary embodiment of the present invention will be described in detail with reference to the accompanying drawings.

FIG. 1 is a configuration block diagram of an apparatus 100 for controlling a start of an engine according to an exemplary embodiment of the present invention. Referring to FIG. 1, the apparatus 100 for controlling the start of the engine 120 may be configured to include a controller 110 configured to exchange and control signals and data between a plurality of components disposed in a vehicle, the engine 120, a first motor 130 connected to a crankshaft of the engine 120 by a connecting device to generate electricity, a main battery 140 configured to supply power to the first motor 130, an auxiliary battery 150 configured to supply a reverse charging power to the main battery 140 when a state of charge of the main battery 140 is insufficient, and a second motor 160 operated as a dedicated starter, or the like.

The controller 110 is configured to monitor the components of the vehicle according to a start command for the engine 120 and the controller 110 is configured to generate diagnostic information as well as a reverse charging control command to supply the reverse charging power to the main battery 140 according to a determination result of the diagnostic information.

The engine 120 may be a continuous variable valve timing (CVVT) engine, a double overhead camshaft (DOHC) engine, a continuous valve timing (CVT) engine, a gasoline direct injection engine, and a multi-point injection (MPI) engine that utilizes gasoline as a fuel, a common rail direct injection (CRDI) engine, a high direction turbo intercooler (HTI) engine, and a variable geometry turbocharge (VGT) engine that utilizes diesel as the fuel, and a liquid propane injection (LPI) engine that utilizes gas as the fuel, or the like.

The first motor 130 may be an inverter integrated mild hybrid starter and generator (MHSG). The first motor 130 may be configured to include an inverter function. Therefore, it is possible to convert generated power of a three-phase alternating current generated in the first motor 130 into a direct current, or conversely convert the direct current into the three-phase alternating current, driving the first motor 130.

The first motor 130 includes a permanent magnet type and an electromagnet, unlike a full hybrid electric vehicle (HEV) motor. That is, a stator includes the permanent magnet type and a rotor includes the electromagnet. An excitation current for prefluxing the electromagnet of the rotor needs to flow in the first motor 130 to drive the first motor 130.

When the state of charge of the main battery 140 is insufficient, the first motor 130 may not receive the excitation current for prefluxing from the main battery 140. When there is no excitation current, a power generation operation of the first motor 130 may not be performed. In the present case, a state in which the auxiliary battery 150 is not charged may be continued and the auxiliary battery 150 may be discharged. Eventually, operation of the electrical components of the vehicle ceases and the vehicle may not move.

To solve the above problem, the main battery 140 is supplied with the reverse charging power from the auxiliary battery 150. Accordingly, the power generation using the first motor 130 may be performed. Hereinafter, the power corresponding to an electrical load which is required to drive the engine 120 may be supplied by the continuous power generation of the first motor 130.

When the state of charge of the main battery 140 is insufficient, the auxiliary battery 150 supplies the reverse charging power to the main battery 140. The main battery 140 may cause the excitation current in the first motor 130 to preflux the rotor of the first motor 130, performing the power generation operation. Accordingly, a torque assist operation as well as the power generation operation may be performed.

The engine 120 and the first motor 130 are connected by a connecting device including a belt. In the general operation mode, the first motor 130 is not in the power generation state even when the engine 120 is driven. Only when the excitation current is applied to the first motor 130, the rotor of the first motor 130 is prefluxed to start the power generation.

The main battery 140 may be a super capacitor or a lithium ion battery. In addition, the main battery 140 may be a plurality of high-voltage batteries for electric vehicles, including a nickel metal battery, a lithium polymer battery, and an all-solid battery. Furthermore, the main battery 140 may be a single battery cell or may be a battery pack in which a plurality of battery cells are disposed in series and or in parallel.

The battery cell may be designed as a cylindrical cell, a prismatic cell, a pouched cell, or the like. The pouched cells may include a flexible cover including a thin film, and an internal of the cover is provided with the electrical components of the battery cell.

The pouched cells are used to realize an optimum spatial and or packing efficiency within a single battery cell. The pouched cells have a low weight as well as a high capacity.

Edge portions of the pouched cells include a sealing joint. The sealing joint connects two thin films of battery cells, and cavities of the thin films that are formed include additional components.

The main battery 140 may have an output voltage of approximately 48 V, but is not limited thereto.

The auxiliary battery 150 may be a lead acid battery but is not limited thereto, and therefore may be the nickel metal battery, the lithium polymer battery, and a lithium ion battery.

The auxiliary battery 150 is charged with the charging power supplied from the main battery 140. In addition, when the main battery 140 is insufficiently charged, the main battery 140 is supplied with the reverse charging power under the control of the controller 110.

The controller 110 is configured to diagnose the components disposed in the vehicle and when it is determined, based on a diagnosis result, that the state of charge (SOC) of the main battery 140 is insufficient, the auxiliary battery 150 is controlled, by generating the reverse charging control command, to supply the reverse charging control command to the main battery 140. Here, the components mainly are power electronic components for the vehicle.

Furthermore, the controller 110 is configured to verify the state of charge using an auxiliary battery status information related to the auxiliary battery 150 and a main battery status information related to the main battery 140.

It is possible to start the engine using the second motor 160 without using the first motor 130 when both the state of charge of the main battery 140 and the state of charge the auxiliary battery 150 are insufficient. Exemplary embodiments of the auxiliary battery status information and or the main battery state information include the state of charge (SOC), a state of health (SOH), a depth of discharging (DOH), a state of function (SOF), or the like.

The engine 120 shown in FIG. 1 includes an engine control unit (ECU), and the first motor 130 also includes a motor controller.

The second motor 160 is a dedicated starter used in the existing HEV. Furthermore, the second motor 160 is connected to the crankshaft by the connecting device to drive the engine.

Figure 2:
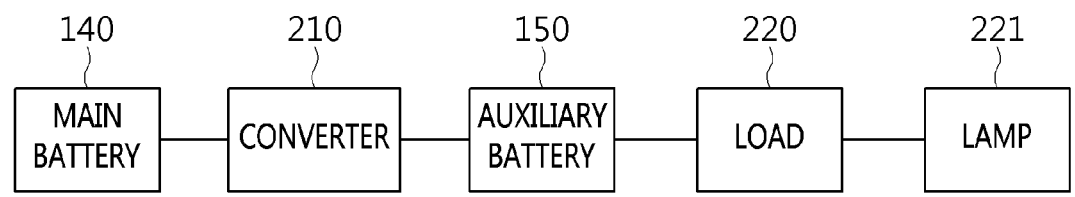
FIG. 2 is a block diagram showing a configuration in which a converter and an electrical load are included in the apparatus for controlling a start of an engine shown in FIG. 1.

FIG. 2 is a block diagram showing a configuration in which a converter and an electrical load are included in the apparatus for controlling a start of an engine shown in FIG. 1. Referring to FIG. 2, a converter 210 is interposes the main battery 140 and the auxiliary battery 150. The converter 210 is a bidirectional converter and performs a bucking and boosting function. When the main battery 140 is normal, a forward power control is performed. Accordingly, the output voltage from the main battery 140 is regulated and supplied to the auxiliary battery 150. For example, in the case of the forward output control, the converter 210 converts 48V into 12V and supplies the 12V to the auxiliary battery 150.

When the state of charge of the main battery 140 is insufficient, the reverse output control is performed. Therefore, the output voltage from the auxiliary battery 150 is regulated and supplied to the first motor 130. For example, in the case of the reverse output control, the converter 210 converts 12V into 48V and supplies the 48V to the first motor 130.

Accordingly, the converter 210 may be a bidirectional low direct current-direct current (DC-DC) converter (LDC). The converter 210 includes a buck and boost circuit.

Meanwhile, the auxiliary battery 150 supplies power to a load 220. The load 220 may be a plurality of electrical components including a lamp 221.

The first motor 130 outputs to the main battery 140 more generated power than the power supplied from the main battery 140 through the power generation.

Figure 3:
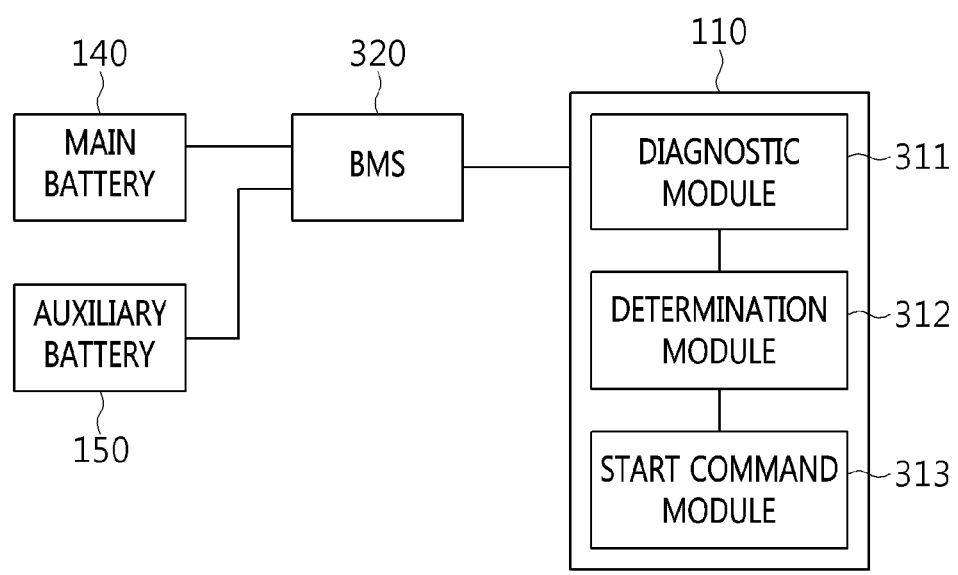
FIG. 3 is a detailed schematic diagram of the apparatus for controlling a start of an engine shown in FIG. 1.

FIG. 3 is a detailed schematic diagram of the apparatus for controlling a start of an engine shown in FIG. 1. Referring to FIG. 3, a battery management system (BMS) 320 configured for managing the main battery 140 and or the auxiliary battery 150 may be implemented.

According to an exemplary embodiment of the present invention, and for understanding, the BMS 320 is shown separate from the auxiliary battery 150 and or the main battery 140, but may be integrated within in the auxiliary battery 150 and or the main battery 140.

The controller 110 includes a diagnostic module 311 configured to monitor the components disposed in the vehicle and generate diagnostic information depending on the monitoring, a determination module 312 configured to determine the state of charge of the main battery 140 or determine the normal state of the components using the diagnostic information, a start command module 313 configured to start the engine 120 using the first motor 130 when it is determined, depending on the determination result, that the state of charge of the main battery 140 is insufficient, and starting the engine 120 using the second motor 160 when the components are an abnormal state, and the like.

The diagnostic module 311 is configured to diagnose the components, including the main battery 140.

The determination module 312 is configured to determine whether the first motor 130 may not generate electricity by not being supplied from the main battery 140 due to the problem with the state of charge of the main battery 140. In addition, the determination module 312 is configured to verify whether the components are in a normal state or an abnormal state.

Figure 4:
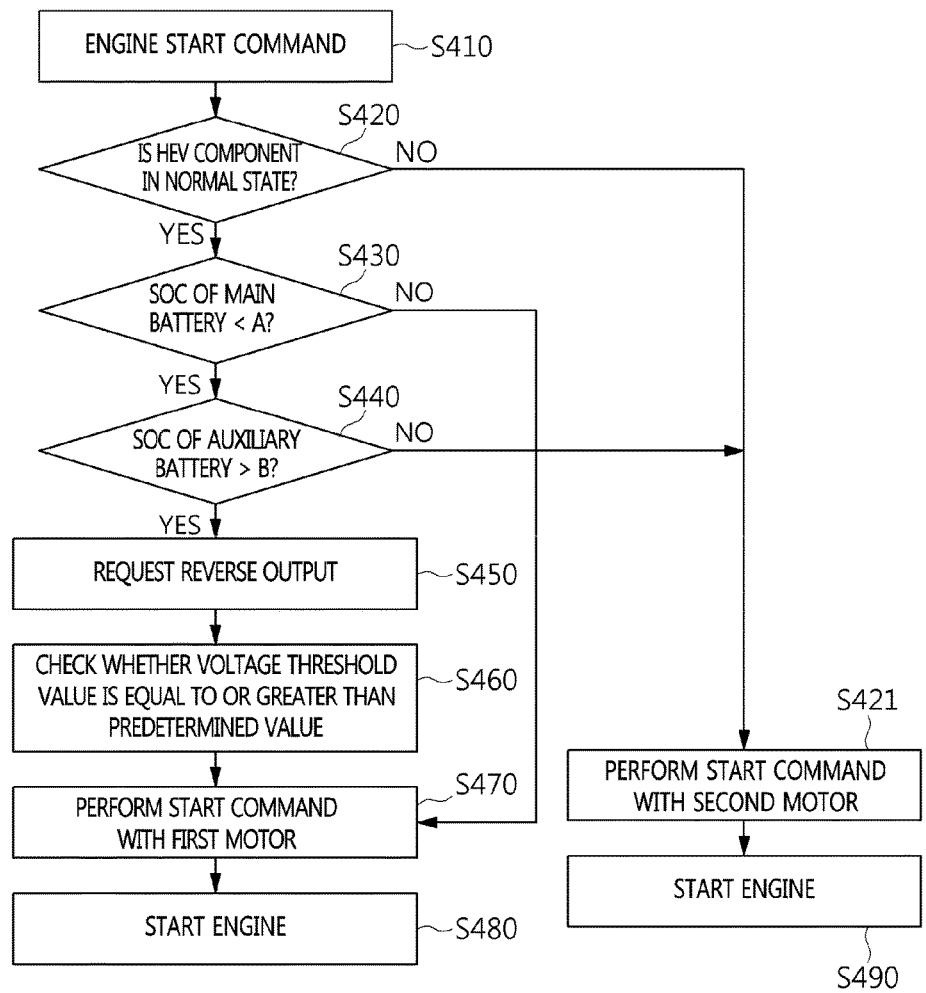
FIG. 4 is a flow chart showing a process of controlling a start of an engine according to an exemplary embodiment of the present invention.

FIG. 4 is a flow chart showing a process of controlling a start of an engine according to an exemplary embodiment of the present invention. Referring to FIG. 4, when a driver starts the vehicle, the controller 110 is configured to monitor the components of the vehicle according to the start command (S410). In the present case, the components are the power electronic components for the vehicle and may be the main battery 140, the auxiliary battery 150, the converter 210, the inverter, or the like.

When it is determined that the components are in a normal state (S420), the controller 110 is configured to verify whether the state of charge (SOC) of the main battery 140 is less than a predetermined first reference value A (S430). When the state of charge (SOC) of the main battery 140 is greater than the predetermined first reference value A, the main battery 140 supplies the start power to the first motor 130 to start the engine 120 (S480).

Thereafter, the controller 110 is configured to generate the diagnostic information depending on the monitoring and checks, based on the monitored diagnostic information, whether the components are in a normal state or an abnormal state (S420).

When it is determined that the state of charge (SOC) of the main battery 140 is less than the predetermined first reference value A (S430), the controller 110 is configured to determine whether the state of charge (SOC) of the auxiliary battery 140 is greater than a predetermined second reference value B (S440).

When it is determined that the state of charge (SOC) of the auxiliary battery 140 is greater than the predetermined second reference value B (S440), the controller 110 is configured to request the reverse control output to the converter 210 to supply the reverse charging power from the auxiliary battery 140 to the main battery 140 (S450).

When a voltage threshold value, depending on the state of charge of the main battery 140, is equal to or greater than a predetermined value, the first motor 130 performs the start command to start the engine 120 (S470 and S480).

Meanwhile, when it is determined that the components are in an abnormal state (S420), the controller 110 is configured to perform a start command with the second motor 160, which is a dedicated starter, to start the engine 120 (S421 and S490).

Furthermore, when it is determined that the state of charge (SOC) of the auxiliary battery 140 is less than the predetermined second reference value B (S440), the controller 110 performs the start command with the second motor 160, which is a dedicated starter, to start the engine (S421 and S490).

According to the exemplary embodiment of the present invention, it is possible to prevent the situation where the engine may not be started when the state of charge of the main battery is insufficient.

Furthermore, according to the exemplary embodiment of the present invention, it is possible to reduce the vibration and or noise when starting the engine.

Furthermore, according to the exemplary embodiment of the present invention, it is possible to reduce the initial time of the engine.

Furthermore, according to the exemplary embodiment of the present invention, it is possible to drive the vehicle when the power electronic component for the vehicle is not operational.

Furthermore, it is possible to secure the power performance by the torque aiding when the state of charge of the main battery is insufficient.

The terms "module", "controller", or the like, described in the specification device a device of processing at least one function or operation and may be implemented by hardware, software, or a combination of hardware and software.

The hardware may be implemented as an application specific integrated circuit (ASIC), a digital signal processing (DSP), a programmable logic device (PLD), a field programmable gate array (FPGA), a processor, a controller, a microprocessor, other electronic devices, or a combination thereof, all of which are designed to perform the above-mentioned functions. The software may be implemented as a module performing the above-mentioned functions. The software may be stored in a memory device and executed by a processor. The memory device or the processor may adopt various devices that are known to those skilled in the art.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and equivalents are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a start of an engine, comprising:
   the engine;
   a first motor connected to a crankshaft by a first connecting device to start the engine;
   a main battery supplying start power to the first motor;
   a controller configured to monitor a plurality of components of a vehicle according to a start command for the engine, and the controller is configured to generate diagnostic information related to the plurality of components and generate a reverse charging control command to supply a reverse charging power to the main battery as a determination result of the diagnostic information;
   an auxiliary battery supplying the reverse charging power to the main battery according to the reverse charging control command; and
   a second motor connected to the crankshaft of the engine by a second connecting device and supplied with the start power from the auxiliary battery as the determination result of the diagnostic information related to the plurality of components.

2. The apparatus of claim 1, wherein the controller includes:
   a diagnostic module generating the diagnostic information;
   a determination module using the diagnostic information to determine a state of charge of the main battery or determine whether the components are in a normal state; and
   a start command module using the first motor to start the engine when depending on the determination result, the state of charge of the main battery is determined to be less than a predetermined amount and starting the engine using the second motor when the components are in an abnormal state.

3. The apparatus of claim 1, wherein
   the first motor is a mild hybrid starter and generator (MHSG); and
   the second motor is a dedicated starter used in a hybrid electric vehicle (HEV).

4. The apparatus of claim 3, wherein the MHSG is an inverter integrated MHSG including an inverter.

5. The apparatus of claim 1, wherein
   the main battery is a super capacitor or a lithium ion battery; and
   the auxiliary battery is a lead acid battery.

6. The apparatus of claim 1, wherein the reverse charging control command is generated when a state of charge of the main battery is less than a predetermined first reference value and a state of charge of the auxiliary battery is greater than a predetermined second reference value.

7. The apparatus of claim 1, further including:
   a converter located between the main battery and the auxiliary battery and configured to regulate power according to a control of the controller and selectively supply the regulated power.

8. The apparatus of claim 7, wherein the converter is a bidirectional low direct current-direct current (DC-DC) converter (LDC).

9. The apparatus of claim 1, wherein the first and second connecting devices are a belt and the components are power electronic components for the vehicle.

10. A method for controlling a start of an engine, comprising:
    monitoring, by a controller, components of a vehicle according to a start command;
    generating, by the controller, diagnostic information related to the components according to the monitoring, and generating a reverse charging control command to supply a reverse charging power to a main battery depending on a determination result of the diagnostic information;
    supplying, by an auxiliary battery, the reverse charging power to the main battery according to the reverse charging control command;
    supplying, by the main battery, a start power to the first motor; and
    starting, by the first motor connected to a crankshaft of the engine by a first connecting device, the engine,
    wherein the generating of the reverse charging control command includes supplying the start power from the auxiliary battery to a second motor connected to the crankshaft of the engine by a second connecting device as the determination result of the diagnostic information related to the plurality of components.

11. The method of claim 10, wherein the generating of the reverse charging control command includes:
    generating, by a diagnostic module, the diagnostic information;
    utilizing, by a determination module, the diagnostic information to determine a state of charge of the main battery or determining whether the components are in a normal state; and
    starting the engine by allowing a start command module to use the first motor when depending on the determination result, the state of charge of the main battery is determined to be lower than a predetermined amount and starting the engine by allowing the start command module to use the second motor when the components are in an abnormal state.

12. The method of claim 10, wherein
    the first motor is a mild hybrid starter and generator (MHSG); and
    the second motor is a dedicated starter used in a hybrid electric vehicle (HEV).

13. The method of claim 12, wherein the MHSG is an inverter integrated MHSG including an inverter.

14. The method of claim 10, wherein;
    the main battery is a super capacitor or a lithium ion battery; and
    the auxiliary battery is a lead acid battery.

15. The method of claim 10, wherein the reverse charging control command is generated when a state of charge of the main battery is less than a predetermined first reference value and a state of charge of the auxiliary battery is greater than a predetermined second reference value.

16. The method of claim 10, wherein the supplying of the reverse charging power further includes selectively regulating and supplying, by a converter located between the main battery and the auxiliary battery, power according to a control of the controller.

17. The method of claim 16, wherein the converter is a bidirectional low direct current-direct current (DC-DC) converter (LDC).

18. The method of claim 10, wherein the first and second connecting devices are a belt and the components are power electronic components for the vehicle.

\* \* \* \* \*